April 14, 1970     B. HERRMANN     3,505,908
TRANSMISSION UNIT
Filed April 29, 1968
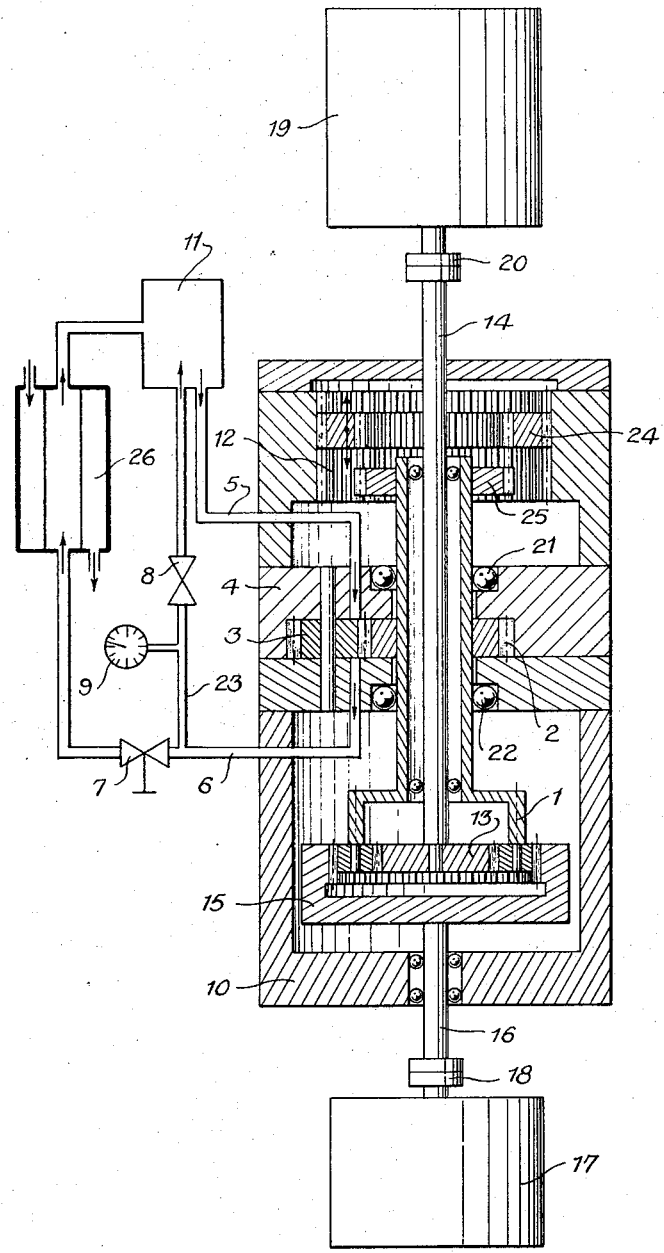
INVENTOR
*Bruno Herrmann*
BY *Stephens, Huettig and O'Connell*
ATTORNEYS

United States Patent Office 3,505,908
Patented Apr. 14, 1970

3,505,908
TRANSMISSION UNIT
Bruno Herrmann, Bridgeport, Conn., assignor to Motoren- und Turbinen-Union, Munich, Germany
Filed Apr. 29, 1968, Ser. No. 724,713
Claims priority, application Germany, Apr. 29, 1967, M 73,794
Int. Cl. F16h *3/44;* F16d *57/06*
U.S. Cl. 74—790                               7 Claims

ABSTRACT OF THE DISCLOSURE

A planetary gear joined to a drive shaft is hydraulically clutched to a driven shaft by gear pumps. Reduction of the fluid flow through the pumps engages the clutch.

---

This invention relates to a transmission unit comprising a planetary gear and a hydrostatic clutch. The object of this invention is to facilitate the starting of power plants, particularly of single shaft turbines driving machines with great masses or requiring great starting torques.

In a single-shaft gas turbine, no usable power is available at a speed below 50% nominal speed; the maximum torque at this speed is 20% of the nominal torque; at approximately one third of the nominal speed no positive moment is available. Below this speed range power must be applied through the starter for starting the gas turbine.

This is disadvantageous in that, in cases where the gas turbine is rigidly coupled to the machine, a starter of uneconomic size would be required for medium and high power. The use of a friction clutch would raise considerable problems, one of these being the abraded material which would affect the life of the high speed turbine bearings. The use of a hydrodynamic clutch would be a solution to these problems, however, under a continuous penalty on the performance which would result in heating up of the transmission fluid and this again would require an additional design effort for the installation of cooling units.

The object of this invention is to provide a transmission unit of unsophisticated design and high reliability and which is composed of a planetary gear and a hydrostatic clutch avoiding the above disadvantages.

In general, this object is obtained in that the planet gear carrier on the driving shaft drives a fluid displacement pump, and a valve in the discharge line of the pump is closable to stop rotation of the planetary gear carrier and thus clutches the driving shaft to the driven shaft.

By using this transmission unit, the starter for the gas turbine, which is used rather rarely anyhow, can be kept very small. The compact design, the use of elements of unsophisticated design and the incorporation of the reduction gear, which is necessary for every gas turbine, result in very low manufacturing costs. In actual operation, the proposed arrangement offers considerable advantages since no consumable parts and operating media will be required. Another advantage lies in the extremely simple clutch operation by opening or closing a valve which makes it very suitable for automatization. Another advantage of a transmission unit according to the invention is the fact that no losses occur due to slippage in continuous operation. Finally, the proposed arrangement ensures trouble free operation due to its simple design and therefore is always ready for operation.

The reduction gear, generally necessary for a gas turbine, is a planetary gear with a rotating planet gear carrier. The planet gear carrier is provided with teething in mesh with a gear wheel and thus forming a gear pump with it; for the latter inlet and outlet lines are provided with an adjustable throttle and a pressure relief valve in the outlet line.

To avoid flow losses, the inlet and outlet line is short-circuited via compensating tank. Another feature of this invention is an additional brake or gear clutch providing a positive connection between the planet gear carrier and the gear case. An overload protection can be provided without any difficulties by installing a pressure relief valve in the outlet line. Thus with the gear clutch disengaged the maximum delivery pressure of the displacement pumps can be adjusted as desired allowing free selection of the maximum moment that can be transmitted by the clutch.

Since the pressure in the outlet line is proportional to the moment transmitted by the clutch, in a further embodiment of this invention, a control line is connected to the delivery line of the displacement pumps which applies pressure to a pressure gauge serving as torque-meter and operates further control units of the transmission unit.

Instead of using a single pump, several pumps can be positioned radially around the hollow shaft of the planetary gear carrier, and all of which are driven by the gear fixed to said shaft.

The means by which the objects of this invention are obtained are described more fully with reference to the accompanying schematic drawing which shows a cross-sectional view through the transmission unit.

In the drawing, a single-shaft gas turbine 19 is connected to a sun gear shaft 14 of the planetary gear through a coupling 20. The ring gear 15 of the planetary gear is connected by shaft 16 to a driven machine 17 through a coupling 18. A planet gear carrier 1 rotates in bearings 21 and 22 in the case. A gear 2 is mounted on the hollow shaft of planet gear carrier 1 serving as central pump driving gear. In the drawing, one gear pump 4 only is shown located in gear case 10. The central pump gear 2 drives a pinion 3. An inlet line 5 runs from the compensating tank 11 to gear pump 4. In an outlet line 6 running from gear pump 4 to compensating tank 11, a valve 7 is fitted. Upstream of the valve a control line 23 branches off, in which a pressure relief valve 8 is arranged and to which a pressure gauge 9 is connected, and finally is routed to compensating tank 11. The positive connection between planetary carrier 1 and the gearcase is effected by means of a gear coupling 12 provided with a coupling ring 24 that can be shifted in an axial direction and features external and internal toothing.

Before starting the gear pump is completely hydraulically relieved, thus planet carrier 1 can rotate freely without any noticeable resistance. Furthermore, output shaft 16 is loaded by the torque of the machine and therefore does not rotate. During the start of gas turbine 19, sun gear 13 is rotated by shaft 14. Due to stationary ring gear 15, sun gear 13 causes planet gear carrier 1 to rotate which does not yet require sizable power. When turbine 19 has reached to minimum speed necessary for power supply, the flow section of valve 7 in supply line 6 of gear pump 4 is reduced. Due to the pressure building up in outlet line 6, planet gear carrier 1 is torque loaded and decelerated through gear 2 forming part of gear pump 4. When valve 7 is completely closed, no more oil will be delivered by the pump so that planet gear carrier 1 will come to a standstill and machine 17 will be coupled to gas turbine 19. With the gear clutch disengaged, the maximum delivery of the gear pump 4 and thus the maximum moment transferred by the clutch will be limited through pressure relief valve 8 arranged in pressure line 23 so that the planetary gear is protected from torque load shocks. The oil pressure produced in the outlet line 6 is proportional to the torque transmitted by the planet carrier and therefore pressure gauge 9 in supply line 23 is used as a torque-meter.

In gear pumps, leakage losses occur at very low speeds or at standstill combined with high pressures, resulting in an increase of the oil temperature and at the same time in slow rotation of planet gear carrier 1. If, after completed braking action, planet gear carrier 1 is to be arrested, then coupling ring 24 is shifted axially in such a manner as to bring into mesh the internal toothing in gear case 10 and gear 25 on planet carrier 1. Thus, no more torque is transferred via the gear pump and any power losses are avoided.

The heat resulting from the braking action will be removed by the oil supplied which will be cooled in a cooler 26.

Having now described the means by which the objects of this invention are obtained, I claim:

1. A transmission unit comprising a planetary gear including a planet gear carrier (1), means for driving said gear carrier, hydraulic pump means (4) driven by said gear carrier and having a liquid inlet line and a liquid outlet line, and infinitely variable valve means connected to said outlet line for reducing the fluid flow in said pump means for stopping rotation of said planet gear carrier and clutching said gear carrier to a load.

2. A unit as in claim 1, said gear carrier comprising a hollow shaft, and a pump drive gear (2) joined to said hollow shaft and forming part of said pump means.

3. A unit as in claim 2, further comprising a compensating tank (11) joined to said inlet line and said outlet line.

4. A unit as in claim 3, said pump means comprising a plurality of gear pumps positioned radially around said hollow shaft and common to said pump drive gear (2).

5. A unit as in claim 3, further comprising a gear case (10), and mechanical brake means (24, 25) for coupling said gear carrier to said gear case.

6. A unit as in claim 5, further comprising a pressure relief line (23) joined to the outlet line (6), and pressure relief valve means connected to said relief line for overload protection.

7. A unit as in claim 6, further comprising pressure gauge means (9) connected to said relief line (23) for serving as a torquemeter.

References Cited

UNITED STATES PATENTS

| | | | |
|---|---|---|---|
| 1,892,021 | 12/1932 | Strigl | 74—790 |
| 2,106,493 | 1/1938 | Byers | 188—92 |
| 2,120,386 | 6/1938 | Baash et al. | 188—92 |
| 2,403,381 | 7/1946 | Lawrence | 74—790 X |
| 2,995,049 | 8/1961 | Bolliger | 74—790 X |
| 3,008,341 | 11/1961 | Cobb | 74—790 X |

LEONARD H. GERIN, Primary Examiner

U.S. Cl. X.R.

74—782, 786; 188—92